United States Patent [19]

Timm et al.

[11] 4,225,683

[45] Sep. 30, 1980

[54] PROCESS FOR PRODUCING ELASTOMERS FROM HETERO-DISPERSE SYSTEMS BY CASTING FROM LIQUID MASS

[75] Inventors: Thies Timm; Claus Hartwig, both of Hamburg, Fed. Rep. of Germany

[73] Assignee: Phoenix Aktiengesellschaft, Hamburg, Fed. Rep. of Germany

[21] Appl. No.: 16,662

[22] Filed: Feb. 28, 1979

[30] Foreign Application Priority Data

Mar. 1, 1978 [DE] Fed. Rep. of Germany ....... 2808668

[51] Int. Cl.$^2$ .............................................. C08L 75/00
[52] U.S. Cl. ..................................... 525/126; 525/130
[58] Field of Search .................... 260/859 R; 525/130, 525/131, 126

[56] References Cited

U.S. PATENT DOCUMENTS

| | | | |
|---|---|---|---|
| 3,663,469 | 5/1972 | Weissmahr | 260/859 R |
| 3,755,241 | 8/1973 | Brady | 260/859 R |
| 3,806,558 | 4/1974 | Fischer | 260/859 R |
| 3,846,163 | 11/1974 | Kest | 260/859 R |
| 3,909,466 | 9/1975 | Matsui | 260/859 R |
| 3,980,595 | 9/1976 | Schonfeld | 260/859 R |

*Primary Examiner*—Paul Lieberman
*Attorney, Agent, or Firm*—Allison C. Collard; Thomas M. Galgano

[57] ABSTRACT

Process for producing elastomer materials which are abrasion resistant in the heat, based on polyurethanes and polyoxides, by reacting aliphatic or aromatic diisocyanates, low molecular polydiols or polydiamines and hydroxyl-containing polyesters or polyethers with a molecular weight between 800 and 5000, especially between 2000 and 3000, in equimolar quantities and in liquid phase, characterized by performing the reaction in the presence of rubber powder having diene units incorporated therein, the powder being dispersed in the reaction mass in an amount of 20%–50% by weight, the reaction being carried out in the presence of sulfur or a peroxide, and the rubber powder having a particle size between 5 and 500μ, the polyurethane reaction mass having a surplus of double bonds capable of cross-linking and casting the elastomer so produced from the liquid mass into molds. Tires made from the elastomers according to the invention are of excellent properties in their tread surfaces.

5 Claims, No Drawings

PROCESS FOR PRODUCING ELASTOMERS FROM HETERO-DISPERSE SYSTEMS BY CASTING FROM LIQUID MASS

The invention relates to the manufacture of elastomers from hetero-disperse systems by casting from a liquid mass. It is known to produce polymeric materials, among other methods very advantageously, by a polyaddition process taking place during casting from a liquid reaction mass, said materials having a wide range of useful properties.

According to the present state of the art, starting materials are primarily polyisocyanates or polyepoxides combined with polyfunctional substances which contain movable hydrogen atoms within their reactive groups, such as polydiols, polyamines, polycarboxylic acids, polyamides, polymercaptans, water and others. The most suitable materials for producing elastomers are reaction products of diisocyanates with diols and diamines and sometimes with higher functional compounds of this class, because they result in rubber-elastic and products with excellent properties, which may also belong to a range of hardness hitherto difficult to achieve.

The present process is meant to serve as an example of producing elastomers as indicated above, without the invention being limited to polyaddition reactions in general and to isocyanate reactions in particular. In the classical process for producing elastomers by means of diisocyanate-polyaddition reactions, as reactive partners for the isocyanate component—primarily aromatic diisocyanates—macrodiols in combination with microdiols or microdiamines are used. The former, also frequently called polymer-diols or simply polyols, are higher molecular products having as a rule primary hydroxyl groups in end position, mostly members from the series of linear (straight-chain) aliphatic polyester- or polyether diols, with molecular weights between 800 and 5000, especially with molecular weights between 2000 and 3000.

It is also possible to take as reactants macrodiols from other groups of compounds, such as so-called telechelic, liquid diols of butadiene or isoprene, which have lately been much advertised, or copolymers of these compounds with styrene, acrylic nitrile, and others. Microdiols or microdiamines are low molecular substances of varying structures having molecular weights in the range between 50 and 500. They, too, have primary OH— or $NH_2$— groups. Frequently used are microdiols as, for example, low molecular alkane diols, but also alkene- or alkine diols. Microdiamines for the diisocyanate-polyaddition process are, in most cases, aromatic diamines, sometimes with nuclear substituents, with a view to decreasing their high reactivity. Aliphatic diamines are only used in special cases for the production of elastomers because of their comparatively much higher reaction velocity with isocyanates.

It is not intended here to go into the details of chemistry and technology in connection with the method of casting elastomers from liquid masses. We mention, instead, the standard literature in this field:

Kunststoff-Handbuch, Vol. 7 (Hoechtlen)
Publisher: R. Vieweg
Carl Hanser Verlag, Munich 1966
J. H. Saunders and K. C. Frisch
"Polyurethane Chemistry and Technology"
Part 1 and Part 2
Interscience Publishers, New York 1964
P. Wright and A. P. C. Cumming
"Solid Polyurethane Elastomers"
Mac Larens & Sons, London 1969

In any case, in the reaction of the diisocyanates with macroor microdiols, the reactants are linked by way of urethane units to form polymer molecules, the structure of which is characterized by a series of flexible and rigid structural blocks resulting from the reaction, in each case, of the diisocyanate with the macro- or microdiols. The ratio of amounts of the "soft" and "hard" segments in the polymer structure determines primarily the hardness of the final products and obviously can be regulated by the amounts of the starting components.

When, instead of the microdiols, microdiamines are used in the polyaddition reaction, the result of the reaction with the isocyanate will be a urea compound, that is to say, finally a polyurethane urea compound will be formed. In the following, no distinction will be made between the two elastomer types and, as a common concept embracing the two, the expression PU-elastomer and PUR will be used.

The degree of crosslinking of PU-elastomers is determined by the isocyanate index selected or the isocyanate characteristic, called in the composition, simply "index" or "characteristic". This figure characterizes in a known manner, the used ratio of equivalents of the isocyanate with respect to the sum of its reactants, (e.g., of macro-plus microdiol). When bifunctional compounds are used exclusively, thus exact equivalent amounts of isocyanates and hydrogen-active substances, i.e., with an index of 1-high molecular chain molecules (theoretically) without crosslinkage are formed. Obtained is a PUR with thermoplastic material properties. Increasing index figures, i.e., an increasing surplus of available cyanate groups, lead to elastomers of increasing density of crosslinking. The crosslinking occurs in this case by reaction of unreacted isocyanate units during the building of the chain. In the following reaction, the less reactive urethane—and urea structures are attacked and thereby intermolecular cross compounds are formed by way of allophanate or biuret units, in bifunctional reaction.

When the properties of such PU-elastomers are compared with those of high-grade, conventional polyene rubbers, which have been crosslinked, e.g., with sulfur, peroxides and others and which contain activated carbon or soot for the achievement of valuable properties, PU-elastomrs will, as a rule in most cases, show superior qualities when tested by most standard methods, at least when they are subjected to normal load or stress or wear conditions. This applies especially when comparing figures for strength and resistance to wear by abrasion. In view of the last mentioned property, it seemed obvious to make attmepts to use PUR as a material for the tread surfaces of tires. Unfortunately, however, the expectations were only partly fulfilled, because it was found that PUR tread surfaces in extreme situations, i.e., in an emergency braking supposed to come suddenly to a full stop from a driving speed of 80 km/hour, did not come up to the specifications corresponding to today's high standards for tires. While tread surfaces of PUR of conventional structure do exhibit a surprisingly retardation in sudden braking performance, there will follow a phase of "after-skidding," during which the material suffers an intolerable loss due to abrasion caused by the high temperature of friction generated, leading, in turn, to a more or less melting-like softening.

Without dealing with further details, it may be assumed that the above-mentioned disadvantageous effect can be caused by an inherent property of conventional PU-elastomers, namely, the thermolability of the points of linkage occurring in the polymer structure during the polyaddition. In the case described above, it is probable that the thermally, most vulnerable allophanate and/or biuret structures are affected, the latter being less stable than the former, according to the literature. The hypothesis that under the temperature conditions of an emergency braking, the linkage points of the structure are split open, is confirmed by the fact that with increasing index of the materials used, losses of abrasion due to wear of the tread surface become more marked, assumming that the index will not be less than about 1.05. It appears that under these conditions, the links in the urethane-and urea structures are sufficiently thermostable, since, with the same isocyanate index, no significant differences are noticeable in emergency braking of elastomers based on polyurethane (use of microdiols) and polyurethanurea (use of microdiamines,) which should de facto occur, since, according to general opinion, urea bonds are superior to urethane bonds as far as their thermostabilty is concerned. (Under the mentioned test conditions, slight differences are likewise noticeable in the behavior of—comparable—PU-elastomers based on polyester or polyether-diols of conventional type.).

There are, of course, a number of measures known to increase in general the thermostability of PU-elastomers, the possiblity of index variation having already been mentioned. Other examples are: Operating with alihatic or cycloaliphatic diisocyanates (aliphatic are of higher thermostability than aromatic ones); the use of special polyester-and polyether-diols with "thermostabilizing" action (incorporation of heterocyclic and armoatic ring structures, and others,) the addition of heat-stablizing agents, the addition of specific microdiols or micro-diamines, and finally, the use of macro- or micro-components with higher functionality than two, and of polyisocyanates with more than two—NCO- groups per molecule. Higher functional macro- and micro-compounds are capable, as long as their reactive groups are primarily bonded, of forming cross-linked structures by way of urethane or urea addition products of higher thermostability than allophanate or biuret bonds, unfortunately, while sustaining loss of other useful properties. Nevertheless, it is possible to reach a gradual improvement of the thermostability in some cases by applying the above-mentioned measures; but the results are, according to experiences hitherto made, not sufficient to reduce the wear significantly at high deformation rates under high loads and correspondingly high temperatures.

Other possibilities of building up thermostable elastomers with the use of isocyanate reactions, are found by processes hitherto unconventional in the elastomer sector. It is thus possible to obtain, e.g., by a trimerization reaction of the isocyanate groups with special catalyst systems (Mannich bases, tertiary amines, carboxylates, phenolate, etc.) very thermostable cross-linkings by way of the formed heterocyclic isocyanurate-ring structures. With similar catalysts, isocyanates in combination with epoxide compounds likewise yield structural units of high thermostability, these compounds being of the type of oxazolidones. Oxocarboxylic acid esters are capable of reacting with isocyanates under formation of hydantion derivatives; finally, carbodiimide units are formed of likewise high thermostability, by the catalytic influence of phospholinoxides on isocyanates with bimolecular condensation (splitting off of carbon dioxide). It is true that when the wear resistance of PU-elastomers with structural units as described is tested under extreme conditions mentioned above, the oiliness or greasiness effect is totally eliminated, but loss of material is still quite considerable, probably as a consequence of the lower level in the mechanical properties as a whole, of PU-elastomer structures. It is, of course, not impossible that by systematic experimentation in the direction of desired improvement, progress may still be obtained.

Other attempts have not been lacking to bring about cross-linking of polyurethane elastomers by agents which are conventionally used, in the vulcanization of all-purpose rubbers made from homo- or copolymers of butadiene or isoprene, the most important vulcanizers still being sulfur and peroxides. In that manner, also components used for making PU-elastomers can be cross-linked, provided that appropriate structural units, active as cross-linking agents, are introduced into the PUR-system. This may be done, e.g., by use of hydroxyl-terminated, liquid diene polymers (telechelics) by polyether- and polyester diols with reactive double bonds in the molecule, by use of unsaturated microdiols, if possible, with allylic double bonds; and, finally, by diisocyanates with vulcanizable structural units in the molecule. Thus, for instance, the methylene group of diphenylmethane-diisocyanate can be radially activated by peroxides. Our own experience has shown that with these systems, dry abrasion under emergency braking conditions can be obtained, though again, the losses of material are too high, compared to PKW quantities of conventional steel cord tires.

When highly active furnace soot is mixed into PUR-systems, in some cases a considerable increase of the wear resistance at extreme load and stress conditions, may be achieved, but only then, when effective quantities are added, i.e., doses of over 25 p/hr. However, the high viscosity of such mixtures makes their processing with conventional casting techniques practically impossible. It has therefore been suggested, for example, that the pasty masses should be introduced into templates by spatulas, and from there passed on to the molds, or, otherwise, considerations for using specially constructed dosing and conveying systems are necessary.

It is the object of the present invention to avoid the above-described shortcomings of the known methods, and to provide a process for making an elastomer material abrasion-resistant while hot, such material to be based on polyurethanes or polyepoxides, the material having high elasticity combined with considerable thermostability, while avoiding the disadvantages of the known processes, as stated above.

More particularly, it is an object of this invention to provide a polymer material having the qualities to make it useful for tread surfaces of tires.

It is a further object of the present invention to make a polyurethane material which is capable of avoiding the undesirable skidding due to melting, which sometimes occurs in emergency braking. Thus, the invention starts from a process for making elastomer materials which are abrasion-resistant in the heat, based on polyurethanes and polyepoxides, by reacting aliphatic or aromatic diisocyanates, low molecular polydiols or polydiamines, and hydroxyl-containing polyesters or polyethers with a molecular weight between 800 and 5000, especially between 2000 and 3000, in equimolar quantities and in the liquid phase.

The present invention is characterized by performing the reaction in the presence of rubber powder, having diene units incorporated therein, which is dispersed in the reaction mass in an amount of 20%–50% by weight, the reaction being carried out in the presence of sulfur or a peroxide, and the rubber powder having a particle size between 50 and 500, especially 20 and 100μ, and the polyurethane reaction mass having surplus double bonds, which are capable of cross-linking and adjusted in molar relation to the diene rubber. In this reaction of a polyurethane reaction mass and the rubber powder, the reaction will take place not only between the molecular components of the polyester or polyether urethane, but also between the diene units of the rubber and the double bonds of the polyurethane, which are capable of cross-linking.

The reactions between the reactive components of the polyurethane and the diene rubber occur in parallel. It is therefore necessary to mix the rubber powder rapidly into the reaction mass while stirring, to obtain uniform distribution. Such types of diene rubber are useful, which have at least one reactive diene group and are therefore capable of reacting with the components of the polyurethane. Types of rubber of this kind are polybutadiene with cis-1, 4-structure, polyisoprene, styrene-butadiene polymer, vinyl rubber, EPDM (ethylene-propylene-terpolymer rubber), a mixed polymer of vinyl rubber of cis-1, 4-butadiene and 35 parts of 1,2-butadiene, copolymers of acrylonitrile and butadiene, poly-chloro-butadiene, ethylene-propylene-copolymer with diene tercomponent, etc.

The indicated amounts of diene-rubber powder of 20%–50% by weight depend on the desired properties. A higher amount of diene-rubber leads to greater hardness. However, the added quantity of active soot or other additive is to be considered as well. It is in proportion to the rubber powder. According to experience, the best soot concentrations lie between 40 and 85 parts by weight, calculated on the rubber component. The cross-linking can be brought about by sulfur or peroxide, depending on the type of rubber. An essential feature of the present material consists of the cross-linking taking place between the polyurethane components and the rubber powder, both components of the former one another and mutually with the rubber. The type of the mutual cross-linking can be regulated by the components used, and is also effective on the properties of the final products.

The diisocyanates used may be aromatic and aliphatic, but also cycoaliphatic. Examples are: Toluylene dissocyanate, diphenylmethane diisocyanate, naphthylene diisocyanate, hexamethylene diisocyanate, isophorone diisocyanate and 2,2,3-trimethylhexane dissocyanate. As a hydroxyl group containing polyesters, compounds of the type of linear or slightly branched polyesters may be used. The hydroxyl numbers are between 40 and 100, the acid numbers between 2 and 4. Hydroxyl groups containing polyethers may also be used, which likewise may be linear or slightly branched. Molar weights lie between 2000 and 4000. The hydroxyl numbers lie between 50 and 60. Instead of soots, other conventional, active fillers may be used, e.g., silica of fine particle size.

In the following, the present invention will be more fully described by a number of examples, but these are given by way of illustration and not of limitation.

EXAMPLE 1

Composition

| Index 1.20 | Parts by weight | |
| --- | --- | --- |
| Macrodiol: Polycaprolactone (M.W. 2000) with 2 OH in final position | 100 | |
| Diisocyanate: 1,4-diphenylmethane diisocyanate | 43.90 | |
| Microdiol: Butenediol (Butene 2 diol 1,4) | 8.46 | |
| Powder rubber (s.a.) | 35.00 | |
| Sulfur | 0.6 | common vulcanization system |
| ZnO acitve | 1.2 | |
| Zn-N-ethylphenyldithiocarbamate | 0.23 | |
| 2,2'-methylene-bis-(4 methyl 6-tert. butyl phenol) | 0.5 | |
| Stearic acid | 1.5 | |

EXAMPLE 2

Production of Elastomer

The macrodiol (Capa 220 = Polycaprolactone having a molar weight 2000 and a Hydroxyl number of 56) is melted at about 100° C.–110° C., admixed with protective agent against aging, Vulkanox BKF, and subsequently the entire amount of rubber powder, together with vulcanizing agents sulfur, Vulkacit P extra N (vulcanization accelerator, zinc-ethyl-phenyl-dithiocarbomate), ZnO, is added and dispersed by a high-speed cutting stirrer having a rpm about 10,000. In order to avoid excessive foaming of the mass in the pre-polymerization phase, about 0.5% by weight of de-foaming agent may be added. As usual, the dispersion is dehydrated or de-gassed in the reaction vessel at a vacuum of about 0.2 bar for 30 minutes, for producing the prepolymer or pre-addition product. After this period, the diisocyanate is added at 120° C. and the operator waits for the termination of the polyaddition reaction in this phase, which takes about 20 minutes. This point is noticeable by the flattening of the temperature gradient after the high temperature peak has been reached, due to the exothermic addition reaction. The mass is then taken from the reaction vessel and at about 90° C. the microdiol (Butene 2 diol 1,4) is added while stirring. The best results as to viscosity of the mass and reaction time are reached at temperatures between 80° C. and 100° C., the time lying between one minute and 10 minutes, mostly between two and five minutes, depending on the temperature.

The finished reaction mixture can then be cast into the mold, whose temperature is adjusted to 110° C. Removal time is about 20 minutes. Afterwards, the product should be tempered, as usual, for at least 12 hours at 100° C., calculated on a maximum wall thickness of 10 mm. The mechanical and technological characteristics of the products, as well as test results, are shown in the annexed pages, where comparison values with other PU-elastomers are also indicated, as well as the abrasion behavior in braking to a sudden stop.

The laboratory method with test strips of 6 mm thickness was chosen to obtain test data independent of the structure of the tire, the profile of the tire, the properties of the test car and the test driver. Practical test drives have shown that this method was well suited for the pre-selection of tire tread surfaces. The testing device consists of a rotating steel drum, onto which the strip to be tested is attached to a holding member and thrust by a jerk at an rpm of 75 km/h with a load of 3100 N (Newton=m. kg. sec$^{-2}$), an overload switch cutting off the electrical drive. This test is repeated five times. The braking path is measured and the mean value is indicated. Furthermore, the abrasion condition is judged and the total loss of material [g] due to wear, is measured.

From the attached data compilation, the superiority of the PU-elastomer, according to the invention, is clearly noticeable. These elastomers practically reach the level of abrasion resistance of high-grade surfaces of PKW steel cord tires.

| TEST METHODS | |
|---|---|
| Pos. 1 to 4: | Ring test DIN 53504 |
| 5 | DIN 53505 |
| 6 | DIN 53513 |
| 7 | DIN 53521 |
| 8 | DIN 53507 - Strip test |
| 9 | DIN 53515 - Angle test with cut-out |
| 10 to 12: | DIN 53521 - Torsion pendulum |
| 13 | DIN 53479 - Hydrostatic scales |

What is clamed is:

1. Process for producing elastomer materials which are abrasion resistant to heat, by reacting aliphatic or aromatic diisocyanates, low molecular polydiols or polydiamines and hydroxyl-containing polyesters or polyethers with a molecular weight between 800 and 5000, in equimolar quantities and in liquid phase, characterized by performing the reaction in the presence of rubber powder having diene units incorporated therein, the powder being dispersed in the reaction mass in an amount of 20%–50% by weight, the reaction being carried out in the presence of sulfur or a peroxide, and the rubber powder having a particle size between 5 and 500μ, the polyurethane reaction mass having a surplus of double bonds capable of cross-linking with the double bonds present in the uncured rubber powder.

2. The process according to claim 1 wherein the molecular weight of the reacted polyesters or polyethers is between 2000 and 3000.

3. The process according to claim 1 wherein the rubber powder dispersed in the reaction mass has a particle size of between 20 and 100μ.

4. The process according to claim 1 wherein as active filler, soot is added to the reaction mixture in an amount of 40–80 parts by weight.

5. A tire cast from the molten mass of the elastomer produced according to claim 1, having a tread surface with a tearing strength of 35, abrasion 27 mm$^3$, Shore Hardness 80 and a resistance to breaking of 23 MPa.

| TEST RESULTS OF BREAKING TO A FULL STOP | | | |
|---|---|---|---|
| BRAKING SPEED: 75 km/h | | | |
| BRAKING LOAD: 310 kp | | | |
| TEST SERIES | INVENTOR'S PUR-SYSTEM | ABRASION FINDINGS | AMOUNT OF ABRASION |
| I | Conventional | Greasy, ropy | 7.8–9.2 g |
| II | Contains ground rubber particles | Dry, crumbly | 3.6–4.6 g |
| III | Contains isocyanurate | Dry, fine particles of abrasion | 7.9–9.4 g |
| IV | Can be vulcanized by the addition of sulfur | Dry, fine to coarse particles of abrasion | 4.2–5.4 g |
| V | Filled with rubber powder | Dry, very fine particles of abrasion | 0.4–0.6 g |
| Rubber tread surface | | " | 0.2–0.4 g |

| PHYSICAL DATA OF THE PUR SYSTEM FILLED WITH RUBBER POWDER, ACCORDING TO THE INSTANT INVENTION | | | |
|---|---|---|---|
| | | INVENTOR'S PUR-SYSTEM | RUBBER TREAD SURFACE |
| 1. Resistance to braking | M Pa | 23 | 16 |
| 2. Braking elongation | % | 410 | 450 |
| 3. Modulus 100% | M Pa | 3.9 | 1.6 |
| 4. Tension value 300% | M Pa | 10.8 | 9.2 |
| 5. Shore hardness A | | 80 | 65 |
| 6. Rebound elasticity at 20° C. % | | | |
| 7. Abrasion | mm$^3$ | 27 | 67 |
| 8. Tearing strength | kN/m | 35 | 35 |
| 9. Tearing strength, according to Graves | kN/m | 40 | 39 |
| 10. Freezing temperature (Ωmax) [°C.] | °C. | −21 | −30 |
| 11. T$_g$ [C.°] | °C. | −40 | −40 |
| 12. Log. decrement 20° (Ω) | | 0.22 | 0.3 |
| 13. Density | g/cm$^3$ | 1.17 | 1.16 |